March 30, 1926. 1,578,313
K. HENCKY
APPARATUS AND METHOD FOR REGULATING THE TEMPERATURE OF SUPERHEATED STEAM
Filed Nov. 7, 1924
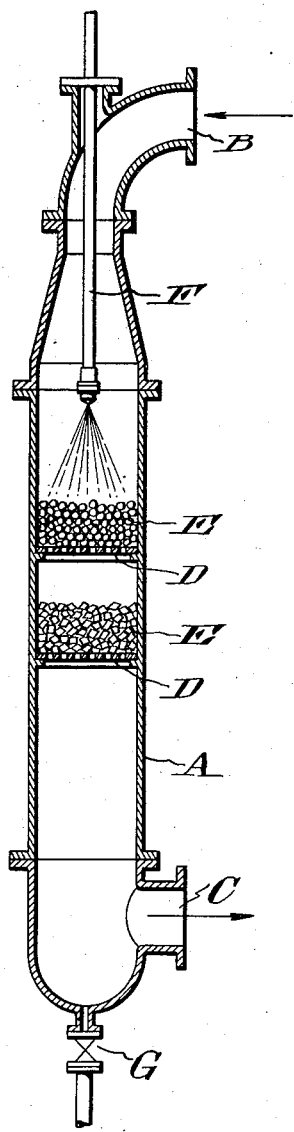

Patented Mar. 30, 1926.

1,578,313

UNITED STATES PATENT OFFICE.

KARL HENCKY, OF LEVERKUSEN, NEAR COLOGNE, GERMANY, ASSIGNOR TO FARBEN-FABRIKEN VORM. FRIEDR. BAYER AND CO., IN LEVERKUSEN, NEAR COLOGNE, GERMANY.

APPARATUS AND METHOD FOR REGULATING THE TEMPERATURE OF SUPERHEATED STEAM.

Application filed November 7, 1924. Serial No. 748,499.

*To all whom it may concern:*

Be it known that I, KARL HENCKY, a citizen of Germany, residing at Leverkusen, near Cologne, in the State of Prussia, Germany, have invented new and useful Improvements in Apparatus and Methods for Regulating the Temperature of Superheated Steam, of which the following is a specification.

This invention relates to the regulation of the temperature of superheated steam by the injection of water thereinto. This method as hitherto employed has the defects that a considerable quantity of water has been injected but only a small portion of this water has been evaporated, and that the transference of heat between the steam and the water is imperfect and consequently the temperature to which the superheated steam is reduced is irregular and the steam contains fine particles of water. Moreover, a large space is required for the heat transference as a direct result of the unfavourable conditions.

According to this invention the temperature of superheated steam is regulated by the formation of a thin film of water of extended area and by causing the steam to pass over or through this film at a high velocity. Preferably the water is sprayed on to a number of balls or the like contained in a conduit through which the steam passes, so that a thin film of large area is formed upon these balls or the like and that the restriction of the conduit due to the presence of the balls or the like causes the steam to pass them at a high velocity.

The invention is illustrated by the accompanying drawing. A is a section of a conduit into which superheated steam can be delivered at B and from which it can be withdrawn at C. In the conduit are supported perforated plates D, D on which are piled metal balls E. Water can be sprayed into the conduit above the upper layer of balls by a pipe F. G is a cock by which any water which may condense at the bottom of the conduit can be drawn off at starting. The conduit section A is preferably arranged with its axis substantially vertical, and the inlet B and outlet C extend laterally from the top and bottom, respectively of the conduit, thus permitting the location of the water spray pipe F and the drain outlet G on the axis of the conduit section.

It has been found that with such an arrangement the temperature and quality of the superheated steam issuing from C are rendered extremely uniform.

The temperature control is obtained by regulating the quantity of water delivered through the pipe F in any suitable manner. Under normal operating conditions the quantity of water required is never in excess of the amount which may be vaporized by the steam as it passes downwardly through the baffle with the extended film of water. By thus passing the steam and water in the same direction over a path of sufficient length to ensure the evaporation of the water, particles of water are not entrained in the exit steam and an exceedingly accurate control of the temperature is possible.

I claim:—

1. A method of regulating the temperature of superheated steam which consists in passing steam downwardly at high velocity over a downwardly-flowing thin film of water of extended area.

2. A method of regulating the temperature of superheated steam which consists in passing the steam at high velocity downwardly through a mass of small particles upon which water is sprayed.

3. Apparatus for regulating the temperature of superheated steam, comprising, in combination with a conduit for superheated steam, a baffle extending across said conduit and having tortuous passages therethrough, and means for spraying water upon said baffle, the combined area of the tortuous passages being materially smaller than the cross-section of the conduit, whereby the velocity of the superheated steam is materially increased as it passes through the wetted baffle.

4. Apparatus as claimed in claim 3, wherein said baffle comprises a mass of heat resistant bodies arranged with interstices therebetween.

5. Apparatus as claimed in claim 3, wherein said conduit is substantially vertical and said baffle comprises a reticulated plate extending across said conduit and a mass of small metal bodies on said plate.

6. Apparatus for regulating the temperature of superheated steam comprising a section of conduit arranged with the axis thereof in substantially vertical position, a reticulated plate extending across said conduit, a mass of small bodies upon said plate, a laterally extending inlet and a laterally extending outlet at the top and bottom, respectively, of said conduit section, and means coaxial with said conduit section for spraying water upon said mass of small bodies.

In testimony whereof I have hereunto set my hand.

KARL HENCKY.